United States Patent [19]

Thomas

[11] Patent Number: 4,969,612
[45] Date of Patent: Nov. 13, 1990

[54] CASSETTE FORMED FROM A BENDABLE MATERIAL

[76] Inventor: Robert G. Thomas, 7 Jason Ct., Wayne, N.J. 07474

[21] Appl. No.: 445,284

[22] Filed: Dec. 4, 1989

[51] Int. Cl.⁵ .......................................... G11B 23/087
[52] U.S. Cl. ..................................... 242/199; 206/387
[58] Field of Search ............... 242/197, 198, 199, 200; 206/387, 396; 229/141, 161, 921

[56] References Cited

U.S. PATENT DOCUMENTS

| | | | |
|---|---|---|---|
| 4,352,578 | 10/1982 | Dunning et al. | 242/55.53 X |
| 4,438,846 | 3/1984 | Stylianou | 206/387 |
| 4,511,037 | 4/1985 | Lucous | 206/396 |
| 4,684,078 | 8/1987 | Shimizu | 242/199 |
| 4,685,638 | 8/1987 | Satoyoshi et al. | 242/199 |
| 4,707,757 | 11/1987 | Shiba et al. | 242/199 X |
| 4,883,176 | 11/1989 | Hart et al. | 206/387 |

*Primary Examiner*—Stanley N. Gilreath
*Assistant Examiner*—William G. Battista, Jr.
*Attorney, Agent, or Firm*—John N. Bain; Raymond J. Lillie

[57] ABSTRACT

A cassette which includes top, bottom and side panels. The top, bottom, and side panels are made of a bendable material such as paperboard. Such cassettes may be produced at low cost and are especially useful in the mass mailing of promotional advertising.

15 Claims, 14 Drawing Sheets

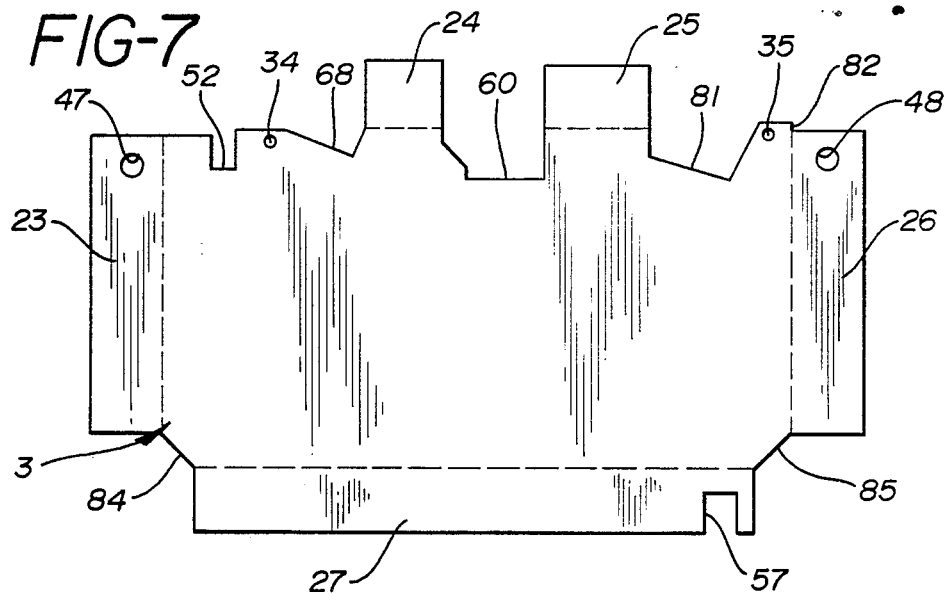
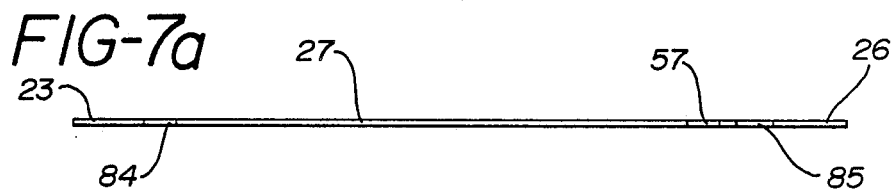
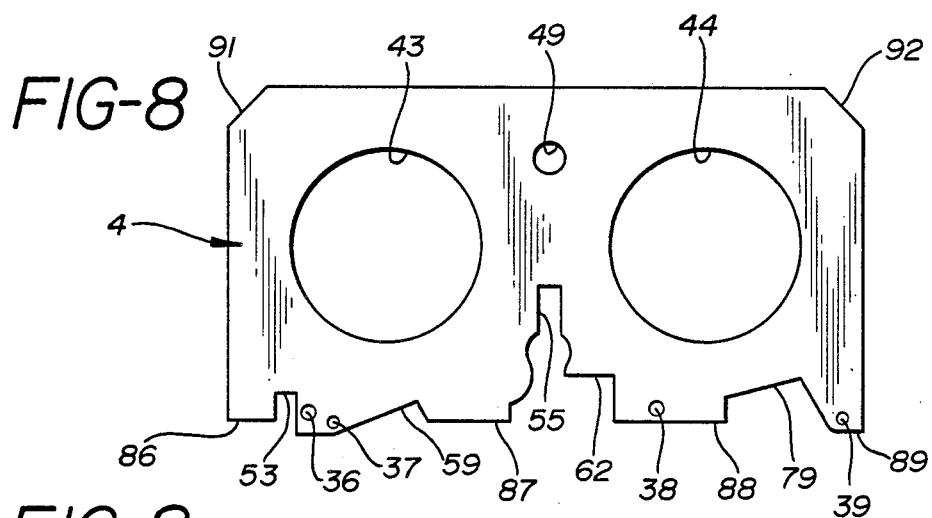
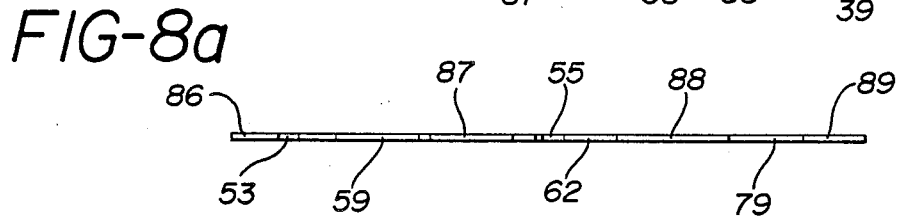

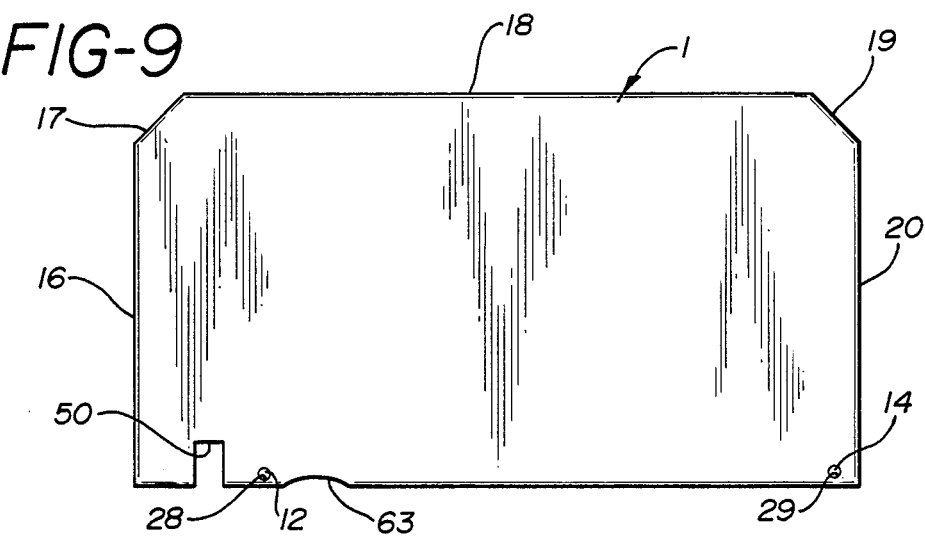
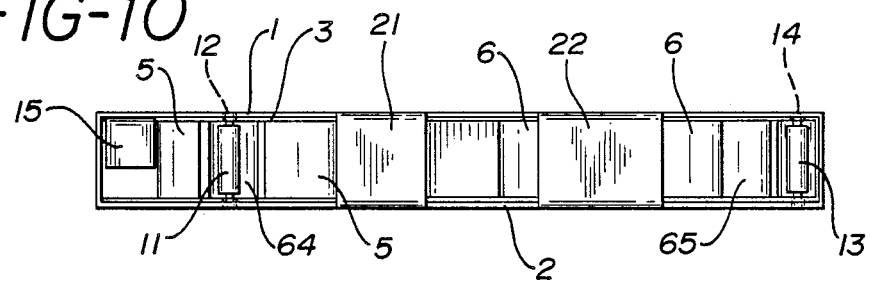
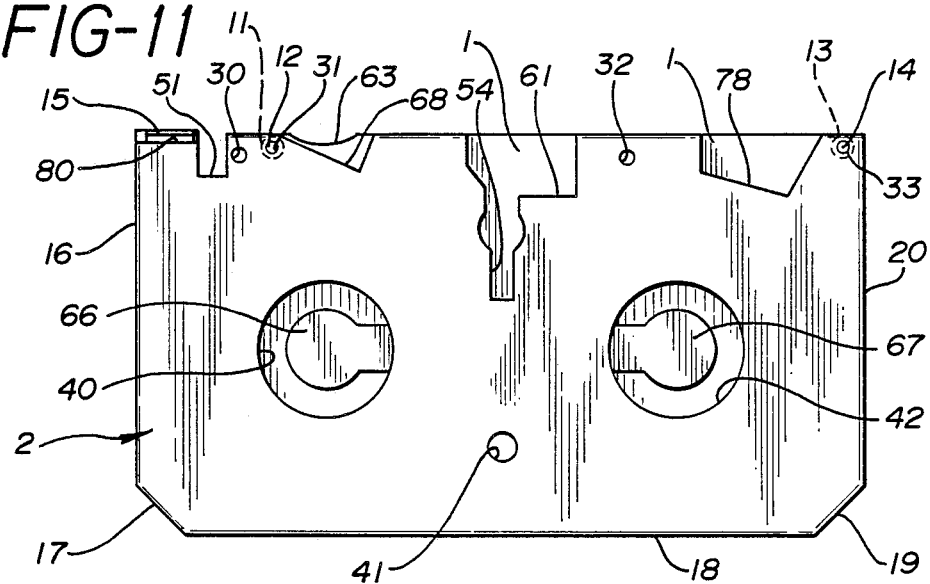

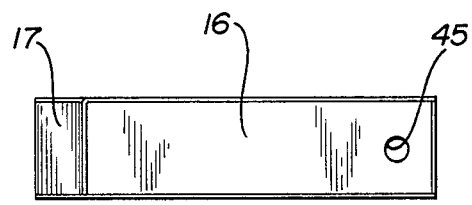
FIG-12
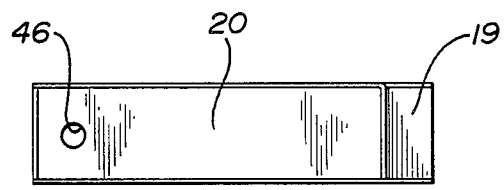
FIG-13
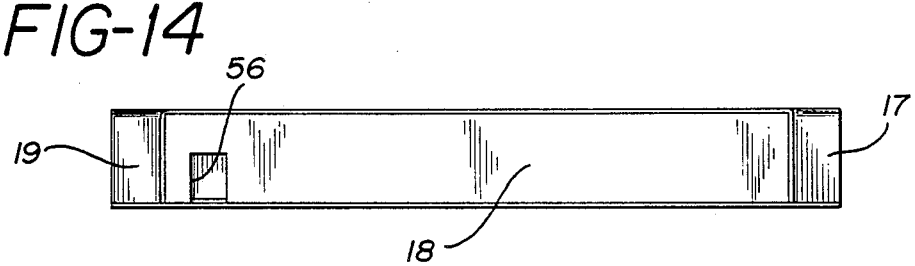
FIG-14
FIG-15
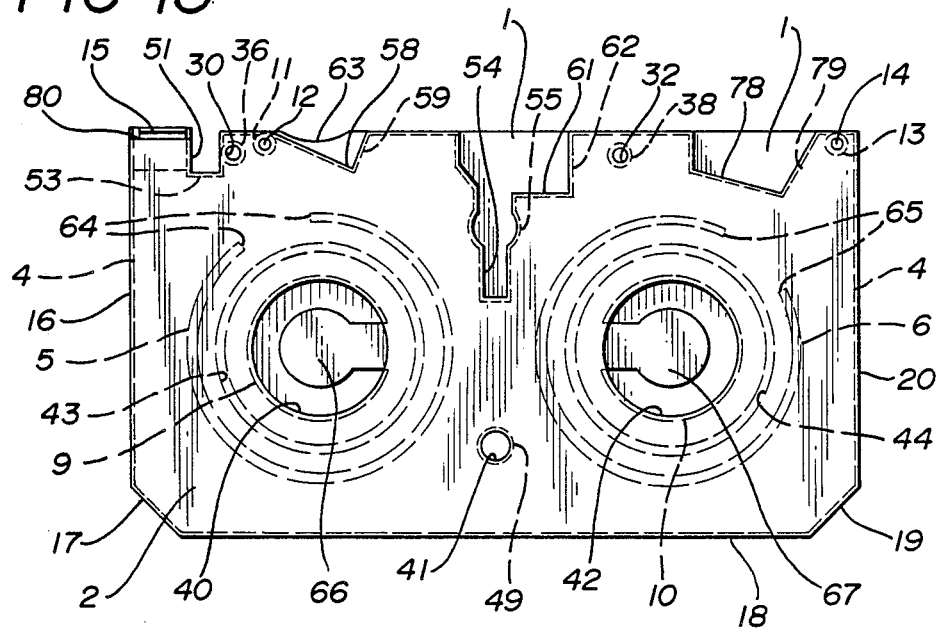

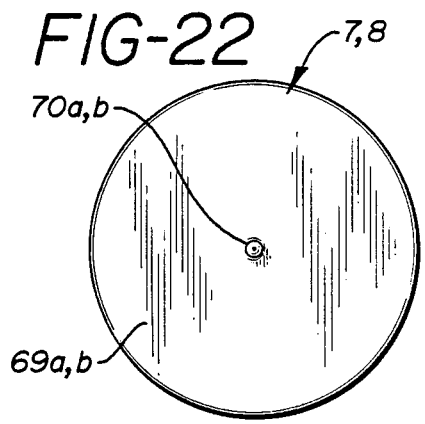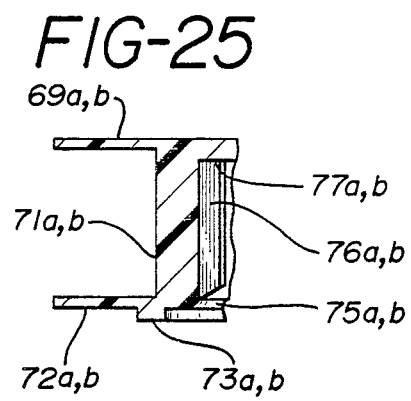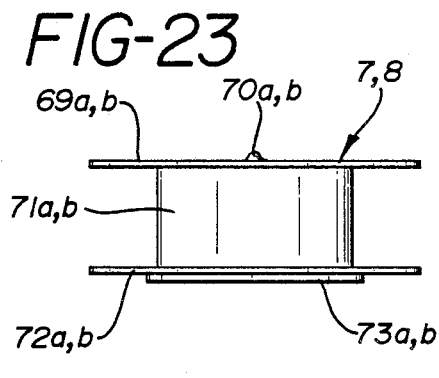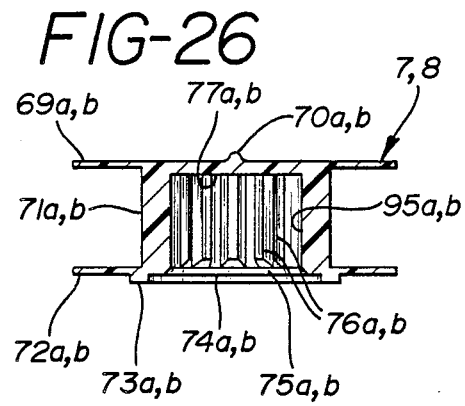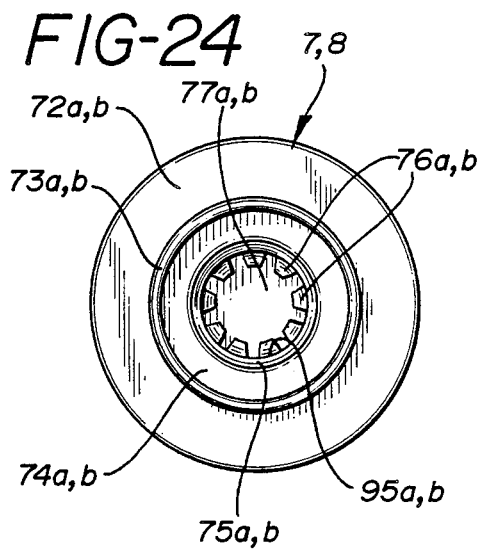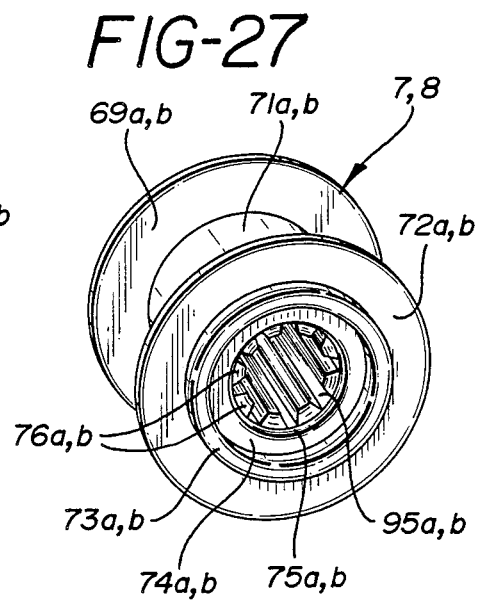

CASSETTE FORMED FROM A BENDABLE MATERIAL

This invention relates to tape cassettes, such cassettes being used in conjunction with a video cassette recorder or tape recorder. More particularly, this invention relates to a cassette made of a bendable material, said cassette being capable of being inserted directly into a video cassette recorder or tape recorder.

U.S. Pat. No. 4,438,846, issued to Stylianou, discloses a blank which may be formed into a box for containing a video cassette. The box is intended for storage of the cassette only, and cannot be inserted into a video cassette recorder.

U.S. Pat. No. 4,352,578, issued to Dunning, et al., discloses a typewriter ribbon cartridge which is made of a bendable material such as cardboard. A blank which can be formed into a typewriter ribbon cartridge is also disclosed. The cardboard cartridge may be inserted directly into the working mechanism of the typewriter.

It is an object of the present invention to provide a cassette which is made of a sturdy yet inexpensive material, thus making the cassette conducive to mass production. Such cassettes may be employed in large mass mailings through direct marketing techniques.

In accordance with an aspect of the present invention, there is provided a cassette which comprises a top panel which includes at least one extended side panel, and a bottom panel which includes at least one extended side panel. The cassette also includes a tape supply reel and a tape take-up reel. The supply reel and the take-up reel are aligned in first and second alignment holes, respectively, in the bottom panel. First and second tension springs are in contact with the supply reel and the take-up reel, respectively. The tension springs maintain the supply reel and the take-up reel rotatably positioned in the first and second alignment holes. First and second guide rollers are connected to the top panel and the bottom panel. The first and second guide rollers are located in a front, cut-away portion of the cassette which contacts a playing mechanism of a cassette recorder. The top panel, bottom panel, and extended side panels are made of a bendable material. In a preferred embodiment, the bendable material is paperboard.

Such paperboard may be composed of recycled paper from sources such as corrugated cardboard, newspapers, and office waste paper. The thickness of the paperboard may be about 0.046 mm (3/64"). It is preferable in many cases to form the panels of the cassette by gluing two paperboards together, thus resulting in panels having a thickness of about 0.093 mm (3/32").

In one embodiment, the cassette further comprises first and second support cores which surround the supply reel and the take-up reel, respectively. Each of the support cores has an opening to accommodate passage of a tape from the supply reel or the take-up reel to the other of the supply reel or the take-up reel.

In accordance with another aspect of the present invention, there is provided a blank which comprises a first panel and a second panel. The second panel has first and second alignment holes, each of which is adapted for receiving a hub of a tape reel. The blank also includes a connecting panel between the first panel and the second panel. The first panel and the second panel are foldable along the connecting panel.

In one embodiment, the first panel may include at least one extended folding panel, preferably two extended folding panels. The two extended folding panels may be located at first and second corner portions at opposite ends of the first panel. The first and second corner portions may be located adjacent the connecting panel.

In another embodiment, the second panel includes at least one extended folding panel. Preferably, the second panel includes at least a first extended folding panel and a second extended folding panel. The first extended folding panel and the second extended folding panel are disposed at opposite sides of the second panel. The second panel may further include at least a third extended folding panel located along a side of the second panel which is not adjacent the first or second extended folding panels, and not adjacent the connecting panel. Most preferably, a fourth extended folding panel is included. The fourth extended folding panel also is located along a side of the second panel which is not adjacent the first or second extended folding panels, and not adjacent the connecting panel.

Such a blank may be folded and assembled such that the first and second panels lies in parallel planes, to form the outer structure of a cassette. It is to be understood that the blank may contain or retain cassette parts such as tape reels, tension springs, guide rollers, and/or support cores. The first and second panels may also have reinforcing panels attached by means of an adhesive.

In accordance with another aspect of the present invention, there is provided a blank comprising a panel having a front edge portion, a rear edge portion, and two side edge portions. The front edge portion is adapted for contacting the playing mechanism of a cassette recorder. In one embodiment, the blank has an extended folding panel attached to at least the rear edge portion. Preferably, an extended folding panel is attached to each of the rear edge portion and the side edge portions, and, most preferably, are further included two extended folding panels attached to the front edge portion.

In an alternative embodiment, the panel includes first and second holes, each of said first and second holes adapted for receiving and positioning a tape reel.

The invention will now be described with respect to the drawings, wherein:

FIG. 7 is a top view of a blank for a top reinforcing panel of the cassette;

FIG. 8 is a top view of a blank for a bottom reinforcing panel of the cassette;

FIG. 9 is a top view of the cassette;

FIG. 10 is a front view of the cassette without a tape;

FIG. 11 is a bottom view of the cassette without tape reels;

FIG. 12 is a right side view of the cassette;

FIG. 13 is a left side view of the cassette;

FIG. 14 is a rear view of the cassette;

FIG. 15 is a bottom view of the cassette, depicting the position of the support cores, alignment openings, and tension springs in phantom;

Figure 1:
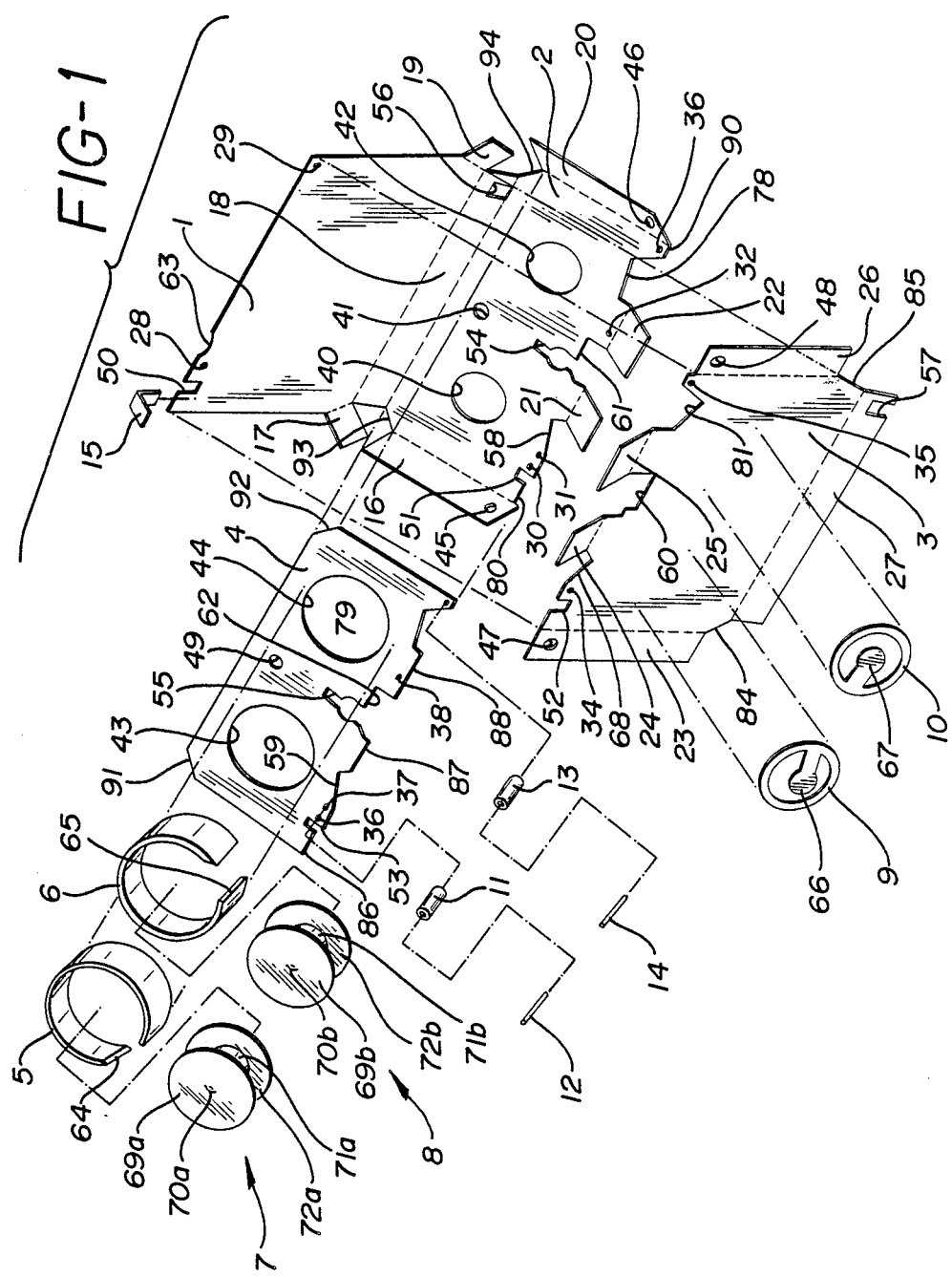
FIG. 1 is an exploded view of an embodiment of the cassette of the present invention.
Figure 2:
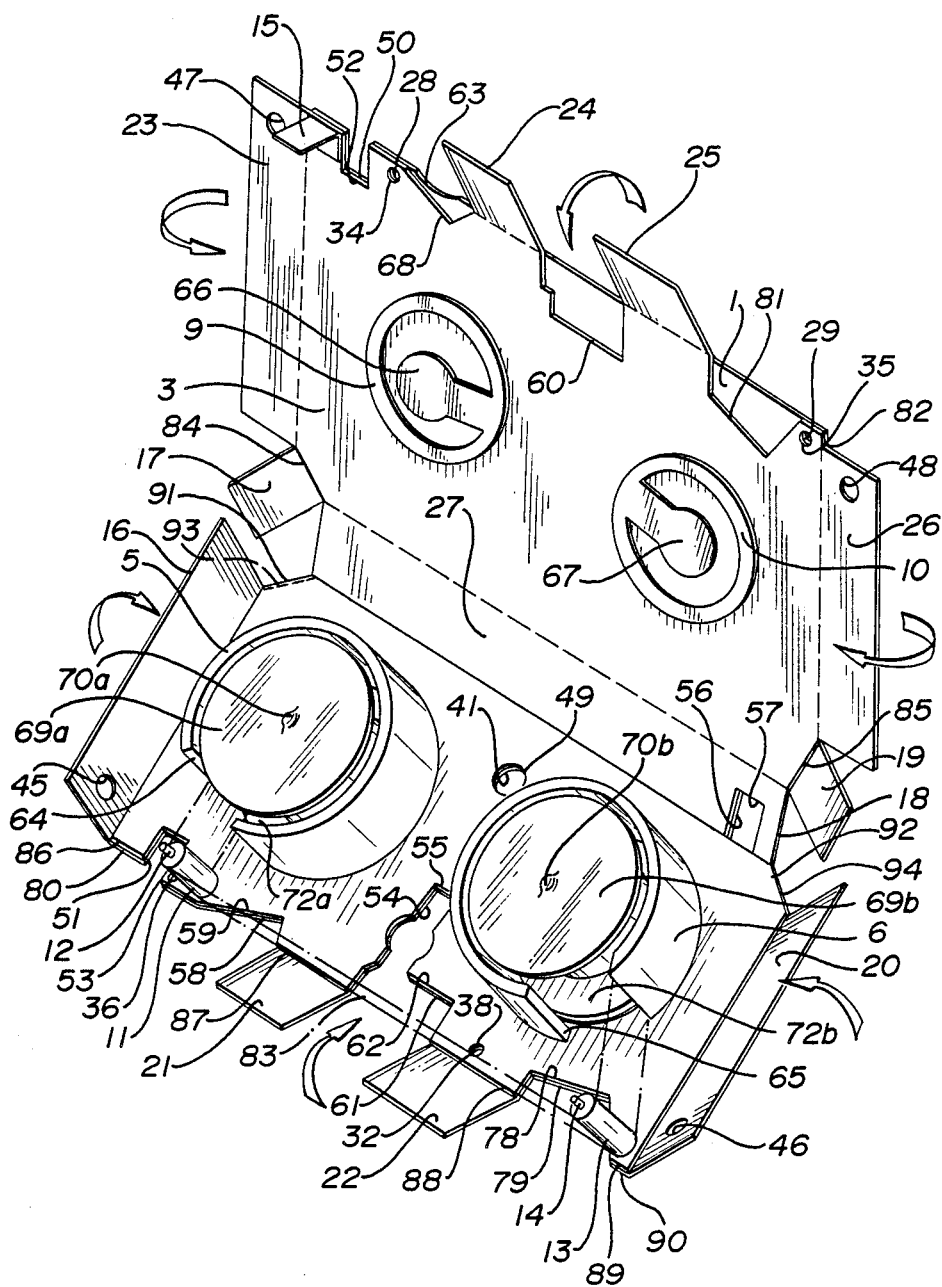
FIG. 2 is a top isometric view of the cassette prior to the folding of the top panel upon the tape reels.
Figure 3:
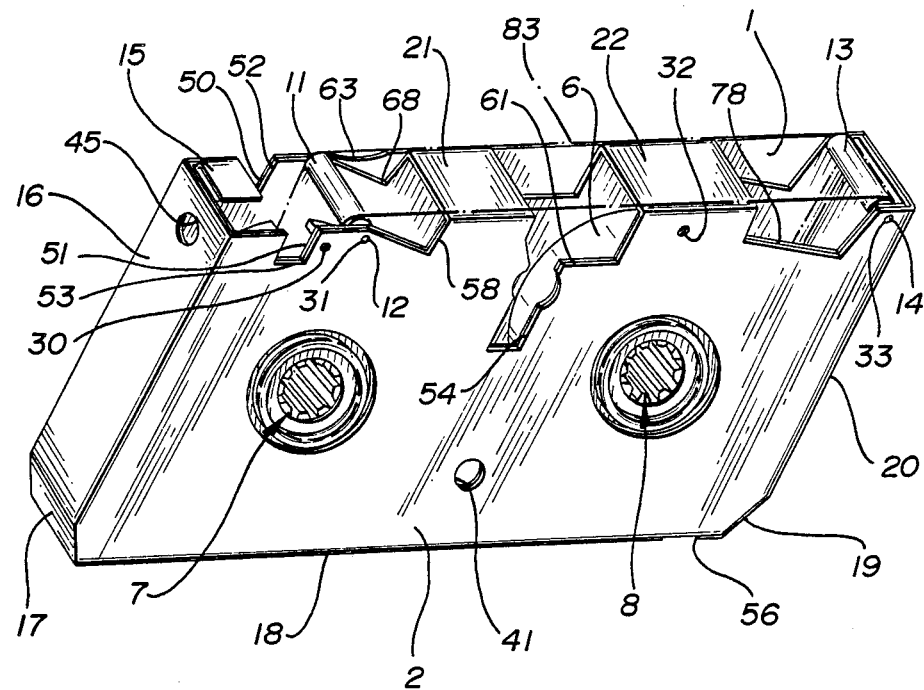
FIG. 3 is a bottom isometric view of the cassette.
Figure 4:
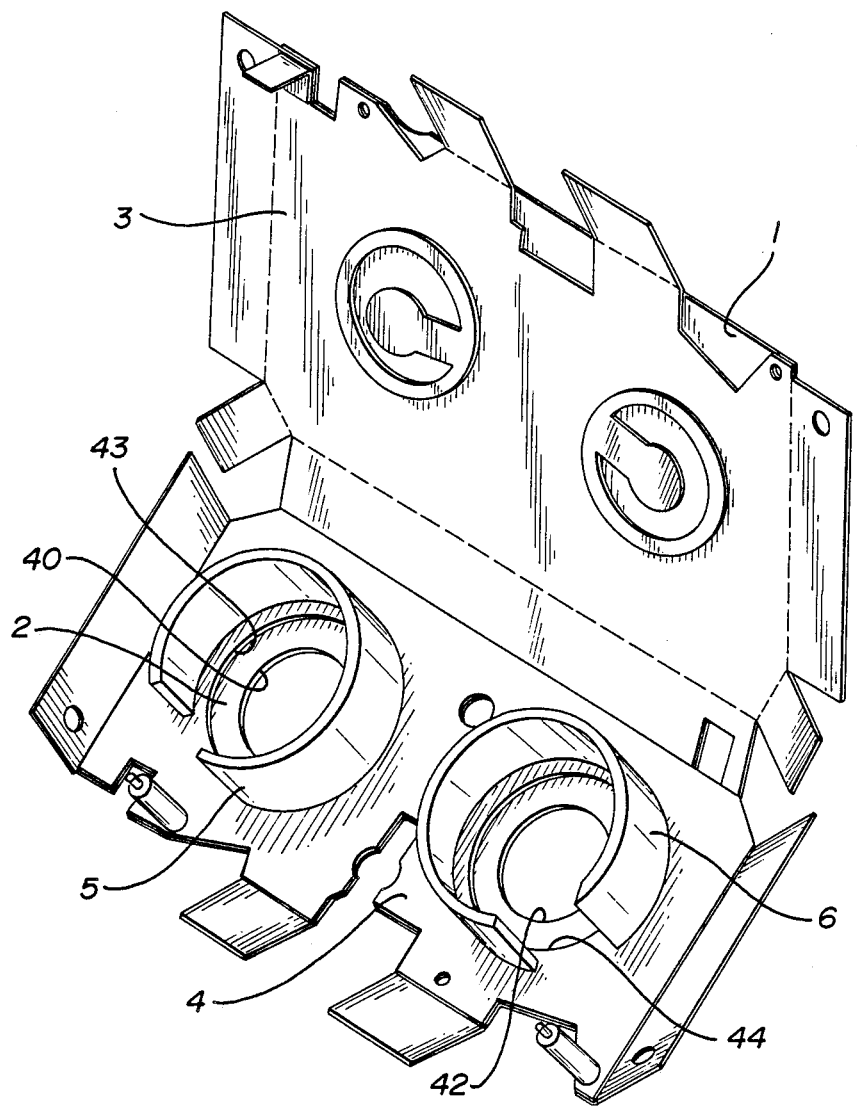
FIG. 4 is a top isometric view of the cassette in an open position prior to the addition of tape reels.
Figure 5:
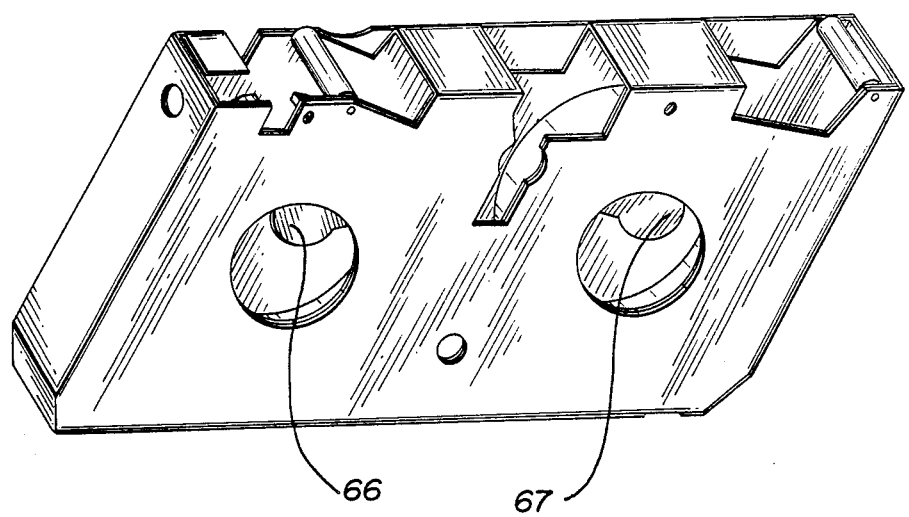
FIG. 5 is a bottom isometric view of a cassette without tape reels.
Figure 6:
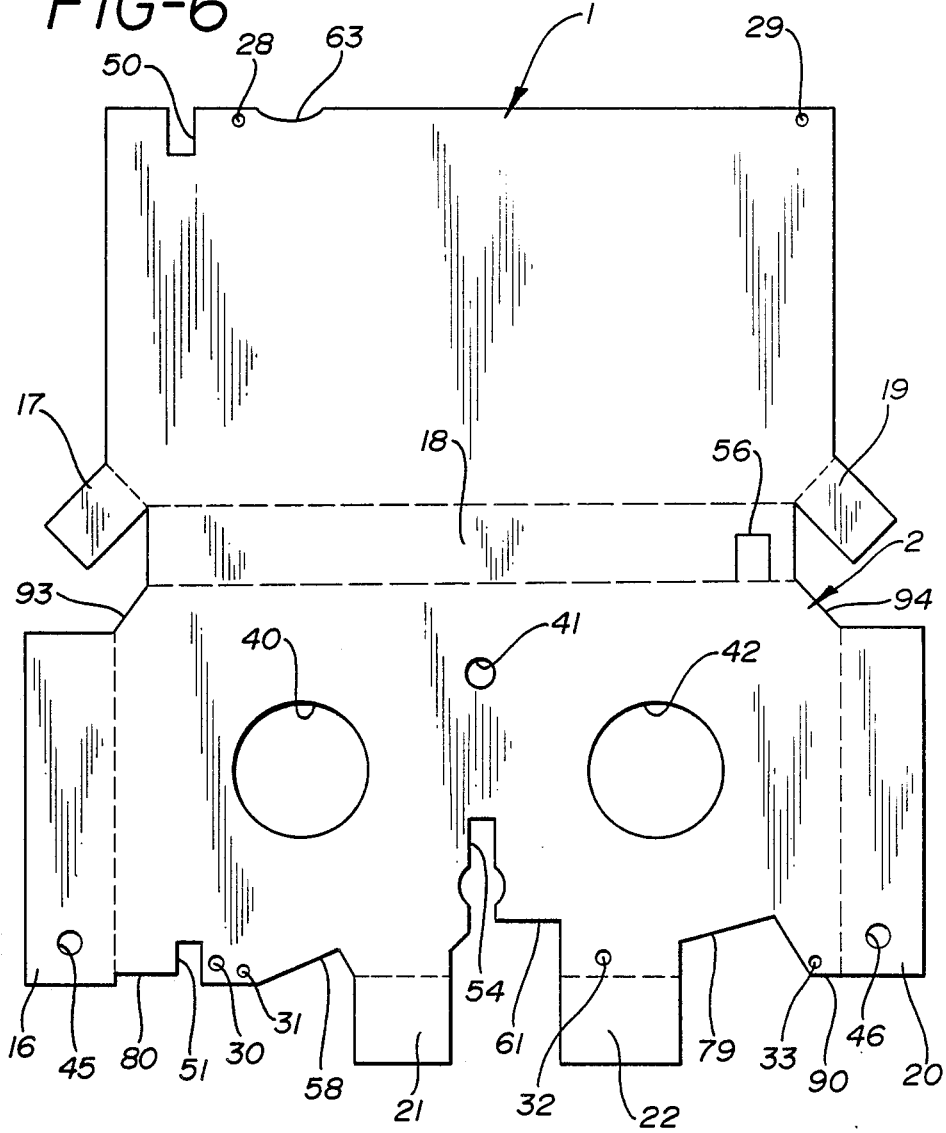
FIG. 6 is a top view of a blank which includes top, bottom, side, and rear panes of a cassette.
Figure 6A:
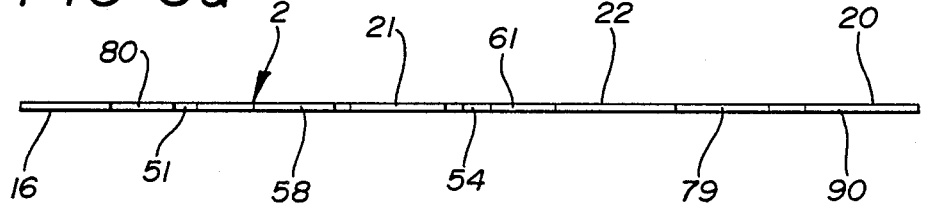
Figure 16:
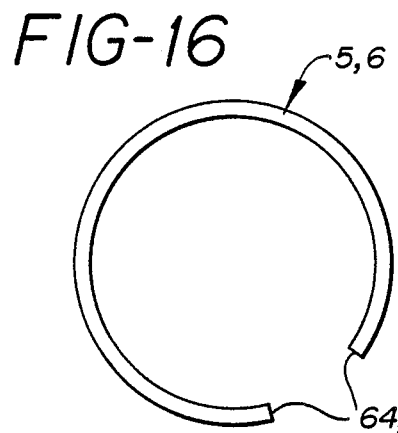
FIGS. 16a and 16b are top and side views, respectively, of a support core for a tape reel.
Figure 16A:
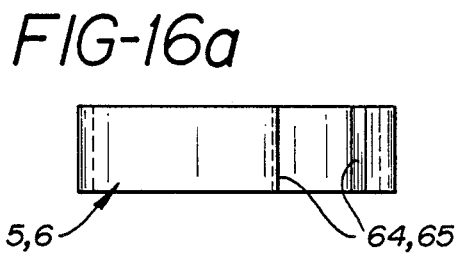
Figure 17:
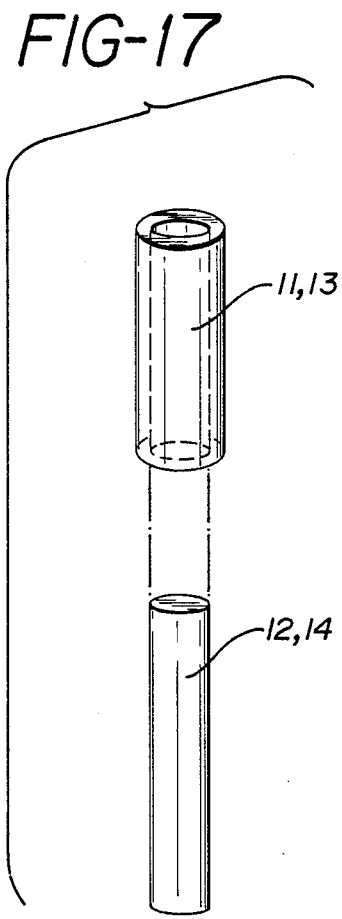
Figure 18:
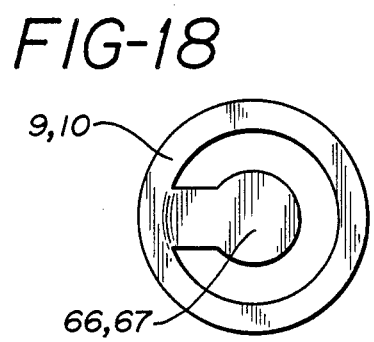
Figure 18A:
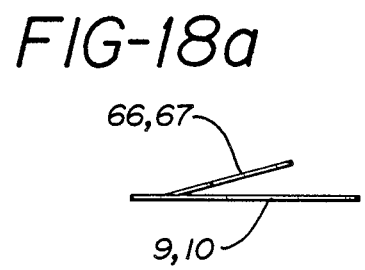
Figure 19:
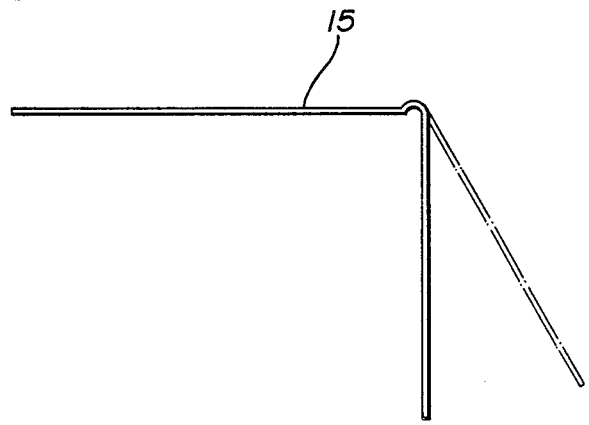
Figure 19A:
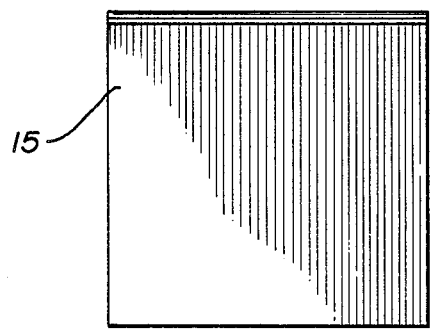
Figure 20:
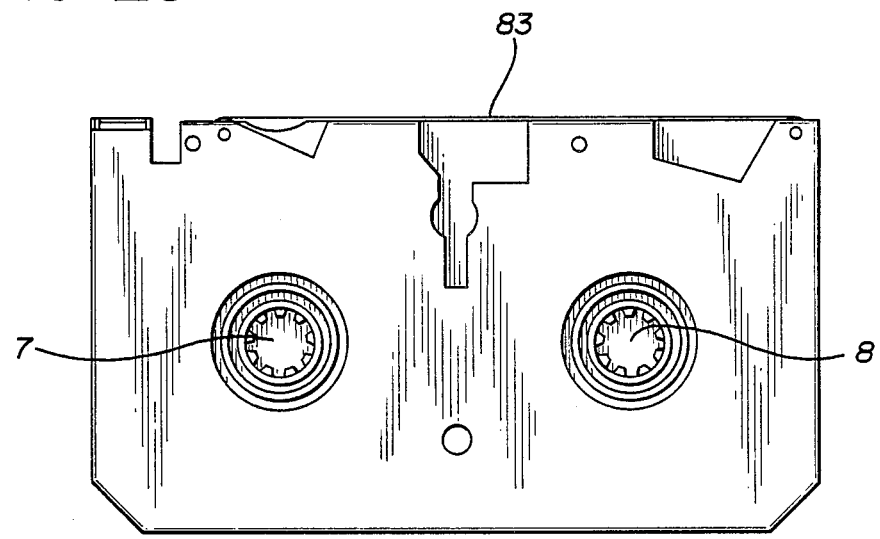
Figure 21:
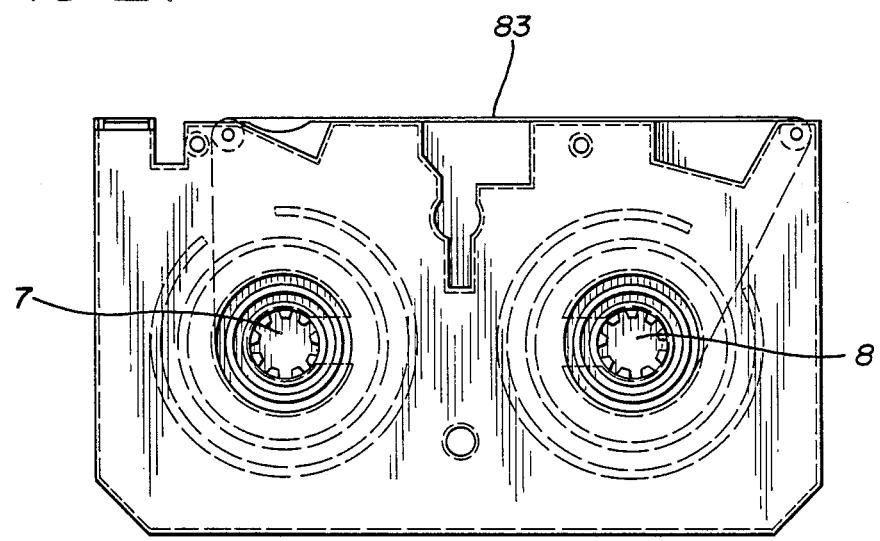

FIGS. 17a, 17b, 17c, and 17d are top and side views, respectively, of a roller and roller shaft;

FIGS. 18a and 18b are top and side views, respectively, of a tension spring;

FIGS. 19a and 19b are front and side views, respectively, of a spring clip of the cassette;

FIG. 20 is a bottom view of the cassette containing tape reels and a tape;

FIG. 21 is a bottom view of the cassette depicting a tape in the interior of the cassette in phantom;

FIG. 22 is a top view of a tape reel;

FIG. 23 is a side view of a tape reel;

FIG. 24 is a bottom view of a tape reel;

FIG. 25 is a cross-sectional view of engaging claws of a tape reel;

FIG. 26 is a cross-sectional view of an entire tape reel;

FIG. 27 is a bottom isometric view of a tape reel; and

Figure 28:
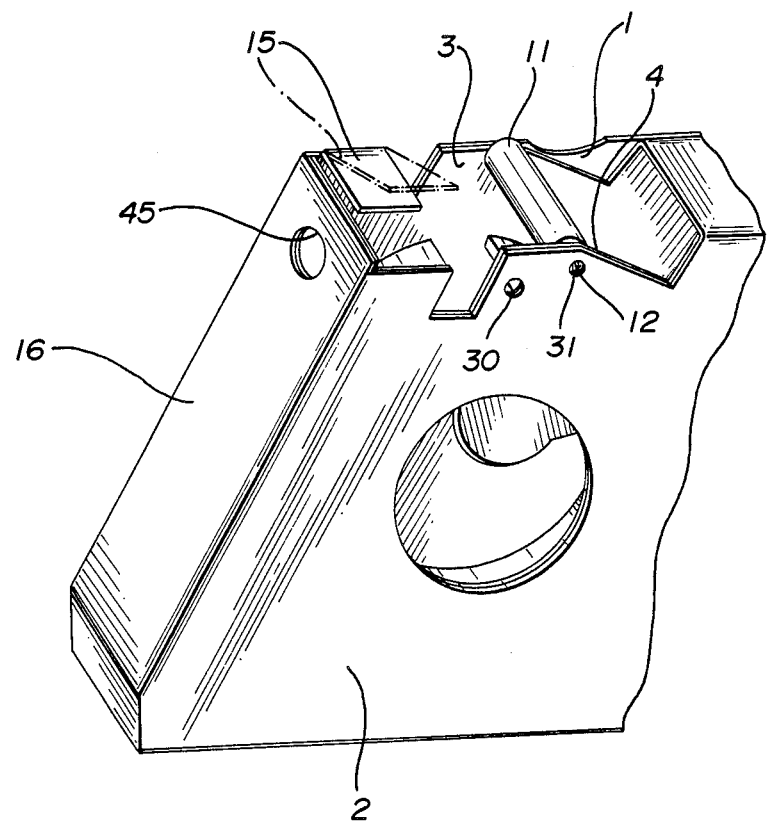

FIG. 28 is a magnified bottom isometric view of the cassette showing the spring clip, with the extended position of the spring clip being shown in phantom.

Referring now to the drawings, the cassette includes a top panel 1, a bottom panel 2, and a rear or connecting panel 18. Top reinforcing panel 3 is attached to top panel 1 by means of an adhesive, and bottom reinforcing panel 4 is attached to bottom panel 2 by means of an adhesive. Panels 1, 2, 3, and 4 are made of a bendable material such as cardboard. Sandwiched between top panel 1 and top reinforcing panel 3 is spring clip 15.

The cassette shown in the drawings is to be used in conjunction with a video cassette recorder. The scope of the invention, however, is not intended to be limited to video tape cassettes. For example, audio cassette tapes in accordance with the present invention may be produced as well.

Upon joining of panels 1 and 3 tap 52 of panel 3 is aligned with tap 50 of panel 1. The diagonal tap 68 of panel 3 aligns with the curved tap 63 of panel 1. Circular holes 34 and 35 of panel 3 align with circular holes 28 and 29 respectively, on panel 1. Folding panels 24 and 25 of panel 3 have edges defined by dotted lines which align with the front edge of panel 1. Panels 24 and 25 become part of the structural support of the front of the cassette, as is hereinafter described. The bendable edges, indicated by dotted lines, of extending folding panels 23 and 26 align with the side edges of panel 1. Panels 23 and 26 will become part of the structural support for the sides of the cassette. Extending panel 27 aligns with rear panel 18, and tap 57 on panel 27 aligns with tap 56 on panel 18. Panels 27 and 18 are not joined with an adhesive.

Diagonal edges 84 and 85 of panel 3 align with the bendable edges of extending panels 17 and 19, respectively, which are attached to panel 1. Panels 17 and 19 are used to support the rear diagonal corners of the cassette, and to prevent the cassette from jamming at the back corners when the cassette is ejected from a cassette recorder.

After panel 3 is joined to panel 1, circular tension springs 9 and 10 are joined by an adhesive to panel 3. Circular tension springs 9 and 10 include arms 66 and 67 respectively, which extend away from the perimeter of the circular tension springs 9 and 10, and are bent at an angle to the underside of panel 3. Preferably, the angle is from about 5° to about 30°. Arms 66 and 67 of tension springs 9 and 10 will make contact with the protruding points 70a and 70b, respectively, of video tape reels 7 and 8, when the cassette is assembled, and hold reels 7 and 8 in position such that reels 7 and 8 are rotatably retained in position. In a preferred embodiment, tension springs 9 and 10 are made of a carbon alloy tempered spring material having a thickness of from about 0.006 to about 0.008 inch.

Bottom reinforcing panel 4 is joined by adhesive to bottom panel 1. The back edge of panel 4 aligns with the back edge of panel 2. Diagonal corner 91 of panel 4 is aligned with diagonal corner 93 of panel 2, and diagonal corner 92 of panel 4 is aligned with diagonal corner 94 of panel 2. The side edges of panel 4 align with the fold lines of extended folding side panels 16 and 20, which are foldable along panel 2 at opposite edges of panel 2. Hole 49 of panel 4 is aligned with hole 41 of panel 2. Holes 43 and 44, respectively, of panel 4 become aligned with holes 40 and 42, respectively, of panel 2. Holes 43 and 44 are slightly larger than the base hubs 72a and 72b, respectively, of tape reels 7 and 8, and are used as guides to hold tape reels 7 and 8 in position when they are not in a cassette recorder. Holes 40 and 42 are smaller than holes 43 and 44 and serve as locator, or alignment guides for tape reels 7 and 8. The undersides of the bottom hubs 72a and 72b, respectively, of tape reels 7 and 8 sit on top of panel 2 with the locator rings 73a and 73b, respectively, of tape reels 7 and 8 fitting inside holes 40 and 42. Locator rings 73a and 73b, respectively, thus act as guides while sitting inside holes 40 and 42 for positioning the tape spindles located inside the recorder.

With regard to the front of panel 4 and the front of panel 2, edge 86 of panel 4 is aligned with edge 80 of panel 2, tap 53 of panel 4 is aligned with tap 51 of panel 2, hole 36 of panel 4 is aligned with hole 30 of panel 2, and hole 37 of panel 4 is aligned with hole 31 of panel 2. Diagonal tap 59 of panel 4 is aligned with diagonal tap 58 of panel 2, and front edge 87 is aligned with the foldable edge, indicated by a dotted line, between panels 2 and 21. Taps 55 and 62 of panel 4 are aligned with taps 54 and 61, respectively, of panel 2. Edge 88 is aligned with the foldable edge, indicated by a dotted line, between panel 2 and panel 22. Hole 38 of panel 4 is aligned with hole 32 of panel 2, tap 79 of panel 4 is aligned with tap 78 of panel 2, edge 89 of panel 4 is aligned with edge 90 of panel 2, and hole 39 of panel 4 is aligned with hole 33 of panel 2.

Plastic shafts 12 and 14 are contained within guide rollers 11 and 13, respectively. The bottom of shaft 12 is inserted into hole 37 of panel 4 and hole 31 of panel 2. The bottom of shaft 14 is inserted into hole 39 of panel 4 and hole 33 of panel 2. The top of shaft 12 is inserted into hole 34 on panel 3 and hole 28 on panel 1. The top of shaft 14 is inserted into hole 35 on panel 3 and hole 29 of panel 1. The ends of shafts 12 and 14 are flush with the exterior surfaces of panels 1 and 2 of the cassette. Each end of shafts 12 and 14 is supported by two panels. Guide rollers 11 and 13 rotate on shafts 12 and 14, respectively, and are disposed between panels 3 and 4. In a preferred embodiment, shafts 12 and 14 and guide rollers 11 and 13 are made of medium impact of polystyrene plastic.

Support cores 5 and 6 are positioned with adhesive onto panel 4, whereby support cores 5 and 6 surround holes 43 and 44, respectively. Support cores 5 and 6 may be made of a bendable material such as cardboard, and serve as crush-proof protection for tape reels 7 and 8.

Tape reels 7 and 8 are positioned such that bottom hubs 72a and 72b, respectively, rest on panel 2 with the edge of the hubs 72a and 72b, respectively, being guided by holes 43 and 44 on panel 4. Locator rings 73a and 73b, located under hubs 72a and 72b, sit in holes 40 and 42 of panel 2.

Tape reels 7 and 8, in a preferred embodiment, may be manufactured as a single piece in plastic formed by a conventional cavity injection molding process. The plastic may be medium impact polystyrene. Tape reels 7 and 8 each have a top flange 69a or 69b, respectively, with a center positioning projection 70a or 70b, respectively, which align with the tension spring arms 66 and 67, respectively of circular tension springs 9 and 10 that are attached to panel 3. A tape leader is attached by means of adhesive to cylindrical reel wall sections 71a or 71b. Tape reels 7 and 8 have bottom reel flanges or hubs 72a and 72b, respectively, which are equal and length and parallel to top flanges 69a and 69b, respectively. Locator rings 73a and 73b, respectively, are located underneath bottom flanges 72a and 72b, respectively. The depth of locator rings 73a and 73b, respectively, is the same as the thickness of panels 2 and 4. Locator rings 73a and 73b sit inside holes 40 and 42, respectively, of panel 2. The diameter of locator rings 73a and 73b is slightly smaller than that of holes 40 and 42, respectively of panel 2, thus allowing for the cassette to be raised and lowered during insertion into and ejection of the cassette from a recorder. Concentric spacers 74a and 74b, respectively, are located between locator rings 73a and 73b, respectively, and diagonally concentric recessed rings 75a and 75b, respectively. Spacers 74a and 74b, respectively, are at the same level as the bottom of lower reel flanges 72a and 72b, respectively.

Recessed rings 75a and 75b have a diagonal pitch of 45°. The top of recessed rings 75a and 75b start the inner cylindrical walls 95a and 95b, respectively, which are parallel to the outer walls 71a and 71b, respectively, and reach to the top center sections 77a and 77b, respectively. Inner cylindrical walls 95a and 95b contain flanged engaging claws 76 which have diagonal edges at the bottom with edges of all flanges parallel and extending to the top center sections 77. Flanged engaging claws 76 are distributed about inner cylindrical walls 95a and 95b, so as to receive a rotatably spindle of a recorder which provides rotational drive to tape reels 7 and 8.

To assemble the cassette, tape reels 7 and 8 are positioned within core supports 5 and 6, and tape stock 83 is positioned in front of rollers 11 and 13. Panels 1 and 3 are then positioned over core supports 5 and 6, which are adhered to panel 4, which is adhered to panel 2. The cartridge is then folded such that side panel 23 attached to panel 3 is glued to side panel 16, which is attached to panel 2. Side panel 26 attached to panel 3 is glued against panel 20 attached to panel 2. Panels 26 and 23 are the inside panels, and panels 16 and 20 are the outside panels. The joining of panels 23 and 16 aligns holes 47 and 45, and the joining of panels 26 and 20 aligns holes 48 and 46. Panels 24 and 25, which are attached to panel 3, are glued against panels 21 and 22, which are attached to panel 2, at the front of the cassette. Panels 24 and 25 are the inside panels. Side diagonal panel 17 has glue applied to three edges and is joined to panels 18, 2, and 16. Side diagonal panel 19 has glue applied to three edges and is joined to panels 18, 2, and 20. Glue is applied to the top of core supports 5 and 6, which will adhere to panel 3 with circular tension springs 9 and 10 fitting securely inside core supports 5 and 6, thus holding tape reels 7 and 8 in place. Tape stock 83 exits out of opening 65 of tape reel 8 around roller 13 to roller 11 and enters reel 7 through opening 64.

The long edges of panels 16 and 20 tuck in under the side edges of panel 1. The ends of panels 21 and 22 tuck in under the front edge of panel 1. The ends of the rear diagonal panels 17 and 19 tuck in under the edge of panel 2.

Circular hole 45 on panel 16, which aligns with circular hole 47 on panel 23, is used to align to a light emitting diode when the cassette is fully inserted into a cassette recorder. Circular hole 46 of panel 20, which aligns with circular hole 48 of panel 26, is also used to align to a light emitting diode when the cassette is fully inserted into a cassette recorder.

Spring clip 15, which is positioned between panels 1 and 3 at the left front corner of the cassette by an adhesive, has a flexible range outward from the cassette of from about 5° to 30°. The movement of spring clip 15 simulates the movement of a front protective plastic cover on conventional plastic video cassettes.

Advantages of the present invention include the ability to provide a cassette made primarily of a firm, yet bendable material. Such cassettes can be produced in mass quantities at low cost. Such cassettes, therefore, are especially useful in providing advertising materials in mass quantities to the consumer public. Such cassettes are also easily disposable, and may be discarded by the user after viewing.

It is to be understood, however, that the scope of the present invention is not to be limited to the specific embodiment described above. The invention may be practiced other than as particularly described and still be within the scope of the accompanying claims.

What is claimed is:

1. A cassette, comprising:
   a top panel including at least one extended side panel;
   a bottom panel including at least one extended side panel,
   said bottom panel including first and second alignment holes;
   a tape supply reel and a tape take-up reel, said supply reel and said take-up reel being aligned in said first and second alignment holes;
   first and second tension springs, said first and second tension springs being in contact with said supply reel and said take-up reel, respectively, and maintaining said supply reel and said take-up reel rotatably positioned in said first and second alignment holes; and
   first and second guide rollers, said first and second guide rollers connected to said top panel and said bottom panel, said first and second guide rollers located in a front, cut-away portion of said cassette which contacts a playing mechanism of a cassette recorder, wherein
   said top panel, said bottom panel, and said extended side panels are made of a bendable material.

2. The cassette of claim 1, and further comprising first and second support cores, said first and second support cores surrounding said supply reel and said take-up reel, respectively, each of said support cores having an opening to accommodate passage of a tape from said supply reel or said take-up reel to the other of said supply reel or said take-up reel.

3. The cassette of claim 2 wherein said first and second support cores are made of a bendable material.

4. The cassette of claim 1 wherein said bendable material is paperboard.

5. A blank, comprising:
a first panel;
a second panel said second panel including first and second alignment holes, said first and second alignment holes adapted for receiving a hub of a tape reel; and
a connecting panel between said first panel and said second panel, said first panel and said second panel being foldable along said connecting panel.

6. The blank of claim 5 wherein said first panel further includes at least one extended folding panel.

7. The blank of claim 6 wherein said first panel includes two extended folding panels.

8. The blank of claim 5 wherein said second panel further includes at least one extended folding panel.

9. The blank of claim 8 wherein said second panel includes at least a first extended folding panel and a second extended folding panel, said first extended folding panel and said second extended folding panel disposed at opposite sides of said second panel.

10. The blank of claim 9 wherein said second panel further includes at least a third extended folding panel, said third extended folding panel located along a side of the second panel not adjacent the first or second extended folding panels, and not adjacent the connecting panel.

11. A blank comprising a panel having a front edge portion, a rear edge portion, and two side edge portions, wherein said front edge portion is adapted for contacting the playing mechanism of a cassette recorder.

12. The blank of claim 11 wherein said blank includes an extended folding panel attached to at least the rear edge portion.

13. The blank of claim 12 wherein an extended folding panel is attached to rear edge portion and to each of said two side edge portions.

14. The blank of claim 13 wherein said blank further includes two extended folding panels attached to said front edge portion.

15. The blank of claim 11 wherein said panel includes first and second holes, each of said first and second holes adapted for receiving and positioning a tape reel.

* * * * *